(12) United States Patent  
Bryant et al.

(10) Patent No.: US 7,701,845 B2
(45) Date of Patent: *Apr. 20, 2010

(54) FORWARDING DATA IN A DATA COMMUNICATIONS NETWORK

(75) Inventors: Stewart F. Bryant, Merstham (GB); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 479 days.

This patent is subject to a terminal disclaimer.

(21) Appl. No.: 11/526,933

(22) Filed: Sep. 25, 2006

(65) Prior Publication Data

US 2008/0074997 A1 Mar. 27, 2008

(51) Int. Cl.
*G01R 31/08* (2006.01)
*G06F 11/00* (2006.01)

(52) U.S. Cl. .................. 370/216; 370/217; 370/389; 370/392

(58) Field of Classification Search .................. 370/216, 370/217, 227, 389, 392
See application file for complete search history.

(56) References Cited

U.S. PATENT DOCUMENTS

| | | | |
|---|---|---|---|
| 4,956,835 A | 9/1990 | Grover | |
| 5,243,592 A | 9/1993 | Perlman et al. | |
| 5,430,727 A | 7/1995 | Callon | |
| 5,959,968 A | 9/1999 | Chin et al. | |
| 6,002,674 A | 12/1999 | Takei et al. | |
| 6,018,576 A | 1/2000 | Croslin | |
| 6,032,194 A | 2/2000 | Gai et al. | |
| 6,061,650 A | 5/2000 | Malkin et al. | |
| 6,111,257 A | 8/2000 | Shand et al. | |
| 6,246,669 B1 | 6/2001 | Chevalier et al. | |
| 6,295,275 B1 | 9/2001 | Croslin | |
| 6,321,271 B1 | 11/2001 | Kodialam et al. | |
| 6,343,122 B1 | 1/2002 | Andersson | |
| 6,349,091 B1 | 2/2002 | Li | |

(Continued)

FOREIGN PATENT DOCUMENTS

CN 1440159 A 9/2003

(Continued)

OTHER PUBLICATIONS

Anonymous, "IS-IS, Intermediate System-to-Intermediate System, ISO 10589," NetworkSorcery.com, downloaded May 21, 2007, pp. 1-4.

(Continued)

*Primary Examiner*—Chi H Pham
*Assistant Examiner*—Farah Faroul
(74) *Attorney, Agent, or Firm*—Hickman Palermo Truong & Becker LLP

(57) ABSTRACT

An apparatus is described for forwarding data in a data communications network having as components nodes and links therebetween in which nodes obtain a reachability metric between a neighbor node and one or more other nodes in the network and in which a repair path is created between an instigating repair node and a receiving repair node around a failure component therebetween. A propagatable repair address for the receiving repair node is reachable by the repair path notvia the failure component. The apparatus is arranged to treat propagatability of the repair address differently via the failure component than via other components.

22 Claims, 9 Drawing Sheets

U.S. PATENT DOCUMENTS

| | | | |
|---|---|---|---|
| 6,473,421 | B1 | 10/2002 | Tappan |
| 6,507,577 | B1 | 1/2003 | Mauger et al. |
| 6,654,361 | B1 | 11/2003 | Dommety et al. |
| 6,690,671 | B1 | 2/2004 | Anbiah et al. |
| 6,697,325 | B1 | 2/2004 | Cain |
| 6,697,333 | B1 | 2/2004 | Bawa et al. |
| 6,714,551 | B1 | 3/2004 | Le-Ngoc |
| 6,718,382 | B1 | 4/2004 | Li et al. |
| 6,724,722 | B1 | 4/2004 | Wang et al. |
| 6,744,727 | B2 | 6/2004 | Liu et al. |
| 6,944,131 | B2 | 9/2005 | Beshai et al. |
| 6,990,068 | B1 | 1/2006 | Saleh et al. |
| 6,993,593 | B2 | 1/2006 | Iwata |
| 7,058,016 | B1 | 6/2006 | Harper |
| 7,158,486 | B2 | 1/2007 | Rhodes |
| 7,177,295 | B1 | 2/2007 | Sholander et al. |
| 7,188,280 | B2 * | 3/2007 | Shinomiya et al. ............ 714/43 |
| 7,242,664 | B2 | 7/2007 | Einstein et al. |
| 7,260,645 | B2 | 8/2007 | Bays |
| 7,274,654 | B2 | 9/2007 | Yang et al. |
| 7,274,658 | B2 | 9/2007 | Bornstein et al. |
| 7,280,472 | B2 * | 10/2007 | Rigby et al. ............ 370/230.1 |
| 7,362,709 | B1 * | 4/2008 | Hui et al. .................... 370/237 |
| 7,490,165 | B1 | 2/2009 | Katukam et al. |
| 7,500,013 | B2 | 3/2009 | Dziong et al. |
| 7,519,009 | B2 | 4/2009 | Fleischman |
| 2002/0069292 | A1 | 6/2002 | Gaddis et al. |
| 2002/0093954 | A1 | 7/2002 | Weil et al. |
| 2002/0112072 | A1 | 8/2002 | Jain |
| 2002/0116669 | A1 | 8/2002 | Jain |
| 2002/0131362 | A1 | 9/2002 | Callon |
| 2002/0171886 | A1 | 11/2002 | Wu et al. |
| 2003/0007500 | A1 | 1/2003 | Rombeaut et al. |
| 2003/0063613 | A1 | 4/2003 | Carpini et al. |
| 2003/0161338 | A1 | 8/2003 | Ng et al. |
| 2003/0193959 | A1 | 10/2003 | Lui et al. |
| 2003/0210705 | A1 | 11/2003 | Seddigh et al. |
| 2003/0233595 | A1 | 12/2003 | Charny et al. |
| 2004/0001497 | A1 | 1/2004 | Sharma |
| 2004/0001508 | A1 | 1/2004 | Zheng et al. |
| 2004/0071089 | A1 | 4/2004 | Bauer et al. |
| 2004/0088424 | A1 | 5/2004 | Luo |
| 2004/0185777 | A1 | 9/2004 | Bryson |
| 2004/0203827 | A1 | 10/2004 | Heiner et al. |
| 2004/0205239 | A1 | 10/2004 | Doshi et al. |
| 2005/0007950 | A1 | 1/2005 | Liu |
| 2005/0047353 | A1 * | 3/2005 | Hares ........................ 370/255 |
| 2005/0068968 | A1 | 3/2005 | Ovadia et al. |
| 2005/0097219 | A1 | 5/2005 | Goguen et al. |
| 2005/0201273 | A1 | 9/2005 | Shimizu |
| 2005/0265228 | A1 * | 12/2005 | Fredette et al. ............ 370/216 |
| 2005/0281271 | A1 | 12/2005 | Beshai et al. |
| 2006/0007929 | A1 | 1/2006 | Desai et al. |
| 2006/0013125 | A1 * | 1/2006 | Vasseur et al. ............ 370/217 |
| 2006/0031482 | A1 | 2/2006 | Mohan et al. |
| 2006/0050630 | A1 | 3/2006 | Kobayashi et al. |
| 2006/0092941 | A1 | 5/2006 | Kusama |
| 2006/0140190 | A1 | 6/2006 | Lee |
| 2006/0187819 | A1 | 8/2006 | Bryant et al. |
| 2006/0193252 | A1 | 8/2006 | Naseh et al. |
| 2006/0268879 | A1 * | 11/2006 | Xhafa et al. ................ 370/392 |
| 2006/0291446 | A1 | 12/2006 | Caldwell et al. |
| 2007/0005784 | A1 | 1/2007 | Hares et al. |
| 2007/0011351 | A1 | 1/2007 | Bruno et al. |
| 2007/0038767 | A1 | 2/2007 | Miles et al. |
| 2007/0091793 | A1 | 4/2007 | Filsfils et al. |
| 2007/0091794 | A1 | 4/2007 | Filsfils et al. |
| 2007/0091795 | A1 | 4/2007 | Bonaventure et al. |
| 2007/0183317 | A1 * | 8/2007 | Vasseur et al. ............ 370/225 |
| 2007/0201355 | A1 * | 8/2007 | Vasseur et al. ............ 370/217 |
| 2007/0248016 | A1 * | 10/2007 | Ashwood Smith et al. .. 370/238 |
| 2008/0062986 | A1 | 3/2008 | Shand et al. |
| 2008/0192627 | A1 | 8/2008 | Lichtwald |
| 2008/0192762 | A1 | 8/2008 | Kompella et al. |
| 2008/0219153 | A1 | 9/2008 | Shand et al. |
| 2008/0317055 | A1 | 12/2008 | Zetterlund et al. |
| 2009/0080431 | A1 | 3/2009 | Rekhter |
| 2009/0129771 | A1 | 5/2009 | Saniee et al. |

FOREIGN PATENT DOCUMENTS

| | | |
|---|---|---|
| WO | WO 02/06918 | 1/2002 |

OTHER PUBLICATIONS

R. Callon, "Use of OSI IS-IS for Routing in TCP/IP and Dual Environments," Internet Engineering Task Force (IETF) Request for Comments (RFC) 1195, Dec. 1990, pp. 1-70.

D. Oran, "OSI IS-IS Intra-domain Routing Protocol" [republication of ISO 10589], IETF RFC 1142, Feb. 1990, 179 pages (see esp. pp. 21-24).

Y. Rekhter et al., "A Border Gateway Protocol 4 (BGP-4)," IETF RFC 1771, Mar. 1995, pp. 1-47.

O. Bonaventure et al., "Ordered convergence and fast reroute for BGP peering links," presentation to Department of Information Engineering, Catholic University of Louvain (UCL) (Belgium), Nov. 22, 2005, 52 pp. (see esp. p. BGP-FRR-52).

C. Hedrick, "Routing Information Protocol," IETF RFC 1058, Jun. 1988, pp. 1-27.

AU Examiner's First Report for foreign patent application No. 2004311004 dated Jun. 23, 2008 (1 pg).

AU Examiner's Second Report for foreign patent application No. 2004311004 dated Aug. 18, 2008 (1 pg).

Current claims for AU foreign patent application No. 2004311004 (6 pgs).

Office Action from CN for foreign application No. 200480033007.8 dated Apr. 11, 2008 (10 pgs) with English translation (11 pgs).

Current claims for CN foreign patent application No. 200480033007.8 (6 pgs).

European Patent Office, "Supplementary European Search Report", application No. EP 04795045, May 27, 2009, 4 pages Claims, application No. EP 04795045, 4 pages.

Raju et al., "A New Approach to On-Demand Loop-Free Multipath Routing", Computer Communications and Networks, 1999, IEEE, Oct. 1999, XP010359531, ISBN: 978-0-7803-5794-5, 6 pages.

State Intellectual Property Office of the People's Republic of China, "The First Office Action", filing No. 200680001652.0, May 8, 2009, 15 pages.

Claims, filing No. 200680001652.0, 4 pages.

European Patent Office, "Communication pursuant to Article 94(3) EPC", Application No. 04795045.6-2416, dated Sep. 7, 2009, 5 pages.

Current Claims, Application No. 04795045.6-2416, 5 pages.

Open System Interconnection Routing Protocol, Jun. 1999, Chapter 41, Internetworking Technologies handbook (all pages of chapter 41).

Open Shortest Path First, Jun. 1999, Chapter 42, Internetworking Technologies handbook (all pages of chapter 42).

* cited by examiner

| DESTINATION 200 | COST 202 |
|---|---|
| B | 1 |
| C | 2 |
| D | 1 |
| E | 2 |

FIG. 2A

| DESTINATION 300 | NEXT HOP 302 | COST 304 |
|---|---|---|
| A | A | 1 |
| C | C | 1 |
| D | A | 2 |
| E | C | 2 |

FIG. 2B

FORWARDING DATA IN A DATA COMMUNICATIONS NETWORK

FIELD OF THE INVENTION

The present invention generally relates to data communications networks and to forwarding data in a data communications network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One class of routing protocol comprises Routing Vector Protocols according to which the path to a network destination is determined based on a reachability metric. One such protocol comprises a distance vector protocol such as the Routing Information Protocol (RIP) which is described in Internet Engineering Task Force (ietf) request for comments (RFC) 1058 and 1723.

A problem that arises with routing vector protocols such as RIP is that if a component fails in the network then packets may be lost while the network converges on a changed topology. For example if node A fails then according to normal forwarding, until node B has updated its forwarding information base, it will forward packets for nodes A and D to node A and those packets will be lost.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates a forwarding information base (FIB);

DESCRIPTION OF EXAMPLE EMBODIMENTS

An apparatus and method for forwarding data in a data communications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Apparatus and Method for forwarding data in a data communications network
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, an apparatus for forwarding data in a data communications network having as components nodes and links therebetween in which nodes obtain a reachability metric between a neighbor node and one or more other nodes in the network and in which a repair path is created between an instigating repair node and a receiving repair node around a failure component therebetween. A propagatable repair address for the receiving repair node is reachable by the repair path notvia the failure component, and the apparatus is arranged to treat propagatability of the repair address differently via the failure component than via other components.

In an embodiment, an apparatus is provided for forwarding data in a data communications network in which a repair path is created between an instigating repair node and a receiving repair node around a failure component therebetween and a repair address for the receiving repair node is reachable by the repair path notvia the failure component, in which the instigating repair node is arranged to compute the repair path computed by a distance vector protocol.

In other aspects, the invention encompasses a computer apparatus and a computer-readable medium configured to carry out the foregoing steps.

2.0 Structural and Functional Overview

Figure 1:
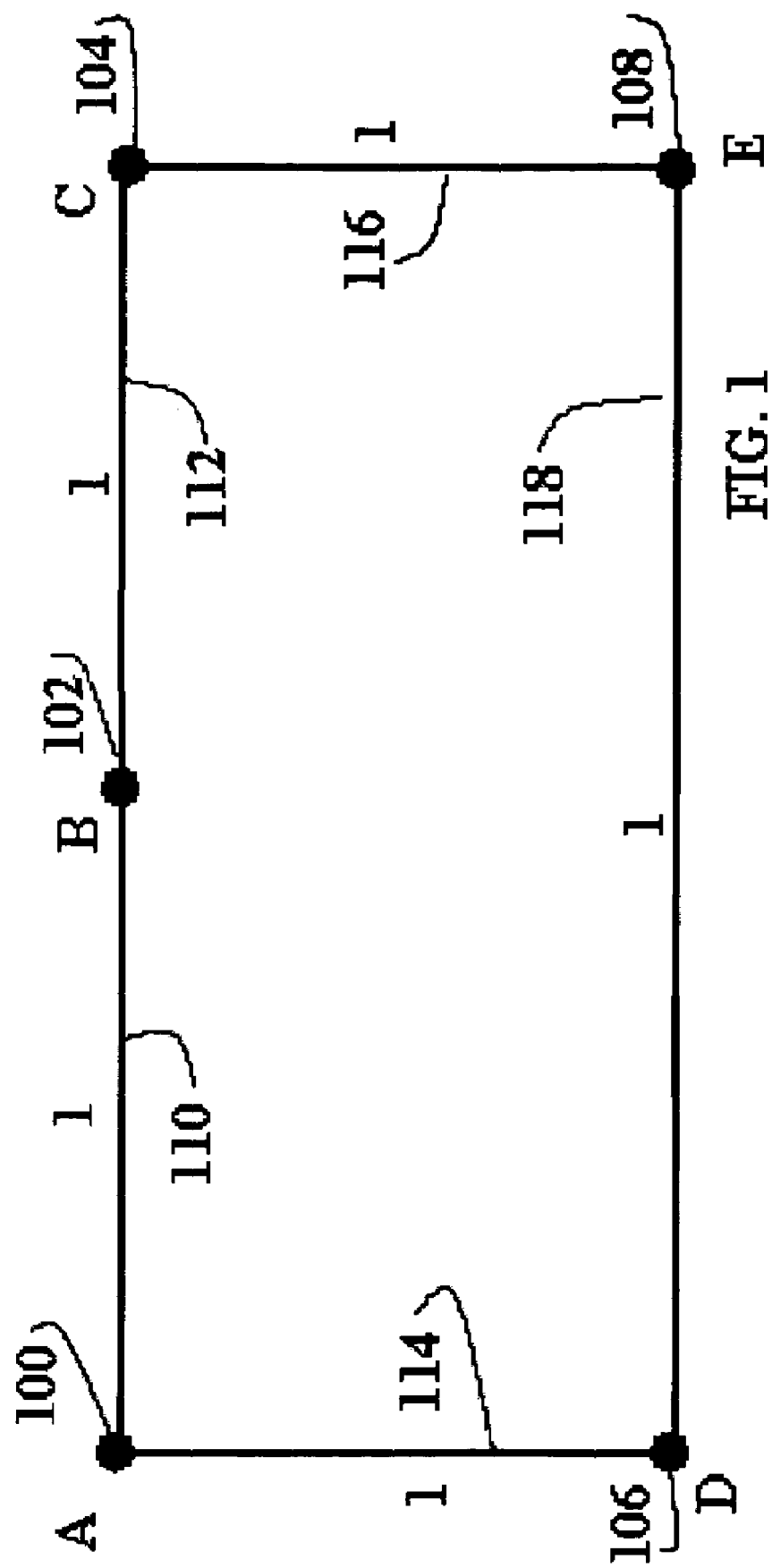
FIG. 1 illustrates a network using Routing Information Protocol (RIP)

Routing Vector Protocols can be understood further with reference to FIG. 1 which is a simple network diagram illustrating RIP. A data communications network includes a plurality of nodes, routers or other appropriate computer apparatus for forwarding data A, B, C, D, E, reference numerals 100, 102, 104, 106, 108. Node A is connected to nodes B and D via links 110, 114, node B is connected to node C via link 112, node C is connected to node E via link 116 and node D is connected to node E via link 118. All of the links have a cost of 1 although of course links may have different costs.

In order to forward data to each destination in the network, each node must compute its nexthop on the basis of some form of least cost path. According to RIP, in order for a node in the network to derive this information, each node advertises to its neighbors a reachability metric indicating its cost to each destination. Accordingly, in FIG. 1, for example node A will advertise to nodes B and D its reachability to each of destinations B, C, D, E. This information can be seen in FIG. 2 which is a table illustrating the reachability metric advertised by node A to node B having a destination column 200 and a cost column 202. It can be seen that a cost of one is advertised for reaching nodes B and D and the cost of two is advertised for reaching nodes C and E. Of course only the lowest cost route is advertised. In a similar manner nodes B and D will advertise information to their neighbors which will be based in part upon reachability information that they received. It will be seen that this approach will be iterative as each node receives further information propagated hop by hop through the network. Eventually, however each node converges on a least cost value for each destination.

Figure 3:
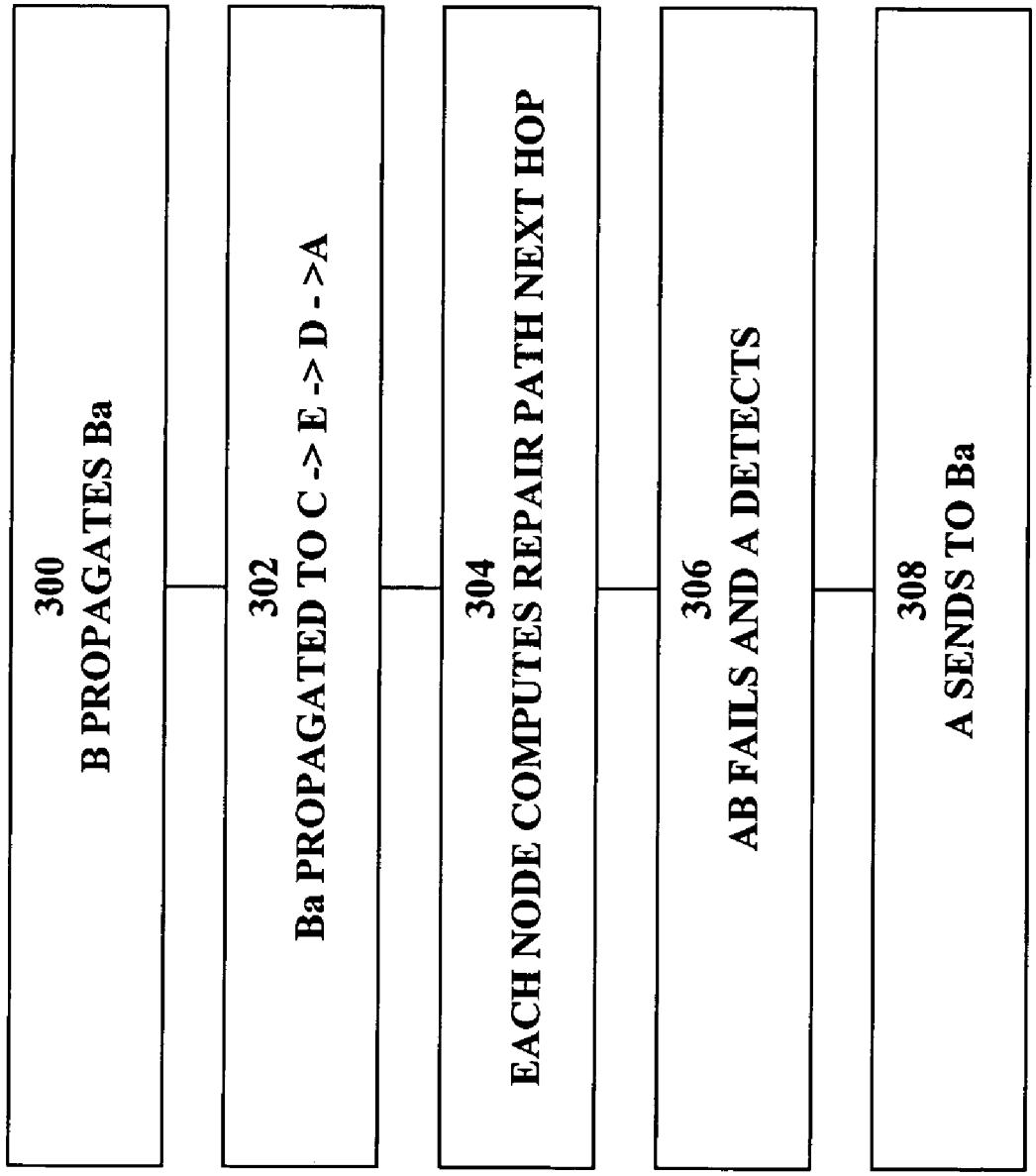
FIG. 3 illustrates steps involved in failure repair for a routing vector protocol.

In addition each node will store the corresponding nexthop, that is, the neighbor node to which it must forward a packet for a given destination along the least cost path. FIG. 3 is a table corresponding to the forwarding information base (FIB) stored at node B once it has converged and based on the information received from its neighbors. In particular the FIB includes a destination column 300 and a nexthop column 302. In addition, 304 shows the cost of reaching each destination although it will be noted that in practice this information may not be stored in the FIB but is shown here for the purposes of comprehension. Hence it will be seen that if node B receives a packet for destination A then its nexthop is of course node A and similarly for node C. If a packet is received at node B with destination node D then the nexthop is node A as the cost via node C would be higher. Similarly for a packet destined for node E the nexthop is node C.

In overview an apparatus and method for forwarding data in a data communications network according to the approach described herein can be understood with reference to FIG. 1 together with FIG. 2 which is a flow diagram illustrating the steps involved in implementing the approach. It would be noted that the approach can be implemented in relation to any network topology and the simplified topology of FIG. 1 is simply for the purposes of comprehension.

In order to repair a failure in the network each node adjacent to the failure acting as instigating repair node computes a repair or backup path around the failure. Then when a failure is detected an instigating repair node will forward subsequent packets which otherwise would have traversed the failure, via the repair path to a receiving repair node. For example where link 110 fails between node A and B and node A detects the failure then packets subsequently received for node B or node C, which otherwise would have gone via link 110, are forwarded according to the pre-computed repair path via nodes D, E and if necessary C. This approach is sometimes termed fast reroute.

The manner in which the repair path is constructed and propagated is by giving each node/interface (ie its connection to each link to adjacent nodes), in addition to its normal address, a propagatable repair address which is reachable via a repair path notvia the failure component, sometimes termed a "notvia address". For example node B may have repair addresses B notvia A (represented here as Ba) and B notvia (Bc). Each other node will have computed its nexthop for each of the notvia addresses. Hence when node A detects failure of link 110 it tunnels subsequent packets for node B to address Ba for which its nexthop is node D. Node D, having precomputed its nexthop for Ba will forward the packet to node E and so forth. It will be noted that node A can forward the packet to Ba in any appropriate way for example by tunneling it to that address. Similarly any packets received at node A for node C will also be tunneled to Ba. Upon decapsulation of the packet at node B it will then be forwarded normally from node B to node C following the original path.

Referring now to FIG. 3, the particular manner in which this approach is instigated in a network implementing a routing vector protocol such as RIP can be further understood. At step 300 node B propagates its notvia address Ba using the standard RIP address propagation approach, together with appropriate reachability metric information (cost zero). However, rather than propagating the address to each of its neighbors, node B only propagates the address to its neighbors which are reachable other than by the failure component, in this case node C. According to normal RIP Node C in turn propagates this address to node E with reachability metric 1 and the address is propagated further to nodes D and A with appropriate increments of the reachability information at step 302. Node A may continue to propagate the information to node B but it will be suppressed at this stage following usual RIP as node B already has a better route.

It will be seen, therefore, that the propagatability of the repair address is treated differently via the failure component (link 110) than via other components, as it is not sent via the failure component. As a result of this a repair path is automatically set up notvia the failure component such that node A's nexthop for Ba is node D which will forward to node E and then to node C and finally to node B. However it will be appreciated that various ways of arranging the apparatus to treat propagatability of repair address differently by the failure component can be implemented. For example node B can propagate Ba to node A which can suppress further propagation thereof, or either of node B or A can attach a differentiating characteristic such as a reachability metric of a suitably large number (for example infinity) such that node A's nexthop for repair address Ba will never be node B.

At step 304 each node computes its repair path nexthop for Ba according to the standard RIP protocol. At step 306 when link 110 joining nodes Ab fails, node A detects, the failure and at step 308 node A tunnels packets that would otherwise have traveled via the failure component to repair address Ba, by encapsulating the packet in a packet with destination address Ba. Each subsequent node in the repair path D, E, C, forwards the packet appropriately such that the data traffic does not travel via the failure component.

As a result, upon failure of the failure component, no node in the network attempts to reach node B via the failure component. Furthermore the repair paths are correctly computed by the routing protocol as part of its ordinary convergence process. As described in more detail below various mechanisms for differential treatment of the propagatable repair address can be adopted. The approach extends to any distance vector protocol in which reachability metric information is exchanged between nodes. In addition the repair can be run using a distance vector protocol or emulation thereof to compute the notvia paths whereas normal routes can be computed using an alternative protocol such as Intermediate System-Intermediate System (IS-IS) or Open Shortest Path First (OSPF).

Although the summary above is presented in relation to repair of failure of a link. It will further be seen that, alternatively, node failure can be repaired as discussed in more detail below.

3.0 Apparatus and Method for Forwarding Data in a Data Communications Network

The use of "notvia addresses" for creating repair paths is described, for example in co-pending patent application Ser. No. 11/064,275, filed Feb. 22, 2005, entitled "Method and Apparatus for Constructing a Repair Path around a non-available Component in a Data Communications Network" of Michael Shand et al, ("Shand et al") the entire contents of which are incorporated by reference for all purposes and if fully set forth herein. However the approaches described therein are generally presented in relation to link-state protocols and the approaches required therein for application in the case of routing vector protocols are described in detail below.

Figure 4:
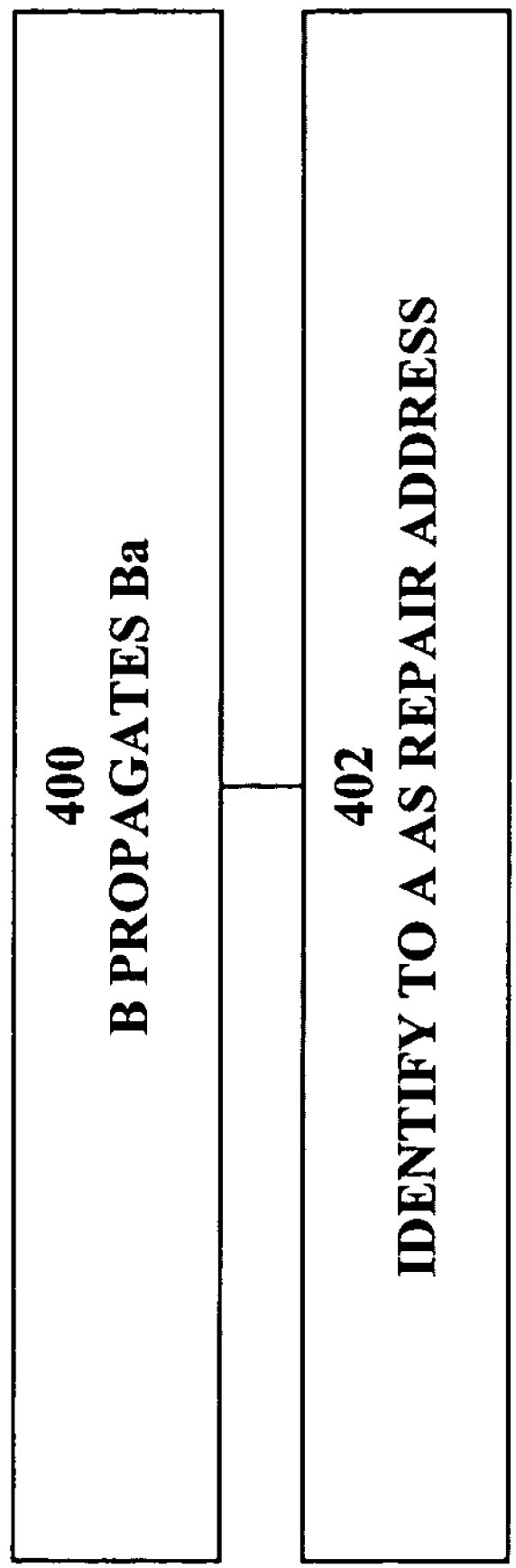
FIG. 4 illustrates in more detail the steps performed at a repair receiving node during failure repair.

Reference is made firstly to FIG. 4 which is a flow diagram illustrating the steps performed at a repair receiving node B in the case of link repair. In the example given above dealing with link failure in relation to link 110 between nodes A and B, at step 400 node B, prior to any failures in order to permit pre-computation advertises Ba to all neighbors except A at cost zero. As a result node C will advertise it at cost 1, node E at cost 2, Node D at cost 3 and node A at cost 4. This will cause the repair path for node B from node A to be via nodes D, E, C, which will of course avoid the failure component, link 110. Of course it will be appreciated that in the more complex topology the correct path will still be adopted. Alternatively Ba can be propagated to node A but with a high cost or cost infinity as a result of which it will be seen that node A, when constructing its FIB will discount node B as its nexthop and instead adopt node D at cost 4. Alternatively still the not-via address can be otherwise identifiable by a differentiating characteristic such that node A handles it appropriately. For example the address can be passed as another address class in the distance vector routing protocol such that node A will suppress its further propagation.

At step 402 in addition, node B can take appropriate steps to ensure that node A recognises Ba as a notvia address to which packets which otherwise would have passed via link 110 must be tunneled via nodes D, E, C. This can be implemented in any appropriate manner from node B, for example the nature of the address may be passed in a Point to Point connection verification protocol such as a routing hello or via bi-directional forwarding detection (BFD). Alternatively, if the notvia address Ba is passed by node B to node A as another address class in the routing protocol then it can be recognized as a notvia address for repairing to the node that forwarded it. In other words node A will recognize that if such a message is received from node B then the address Ba is that which node A must repair to if link 110 joining nodes A and B fails. Alternatively again node A may take its own steps as described in more detail below.

Figure 5:
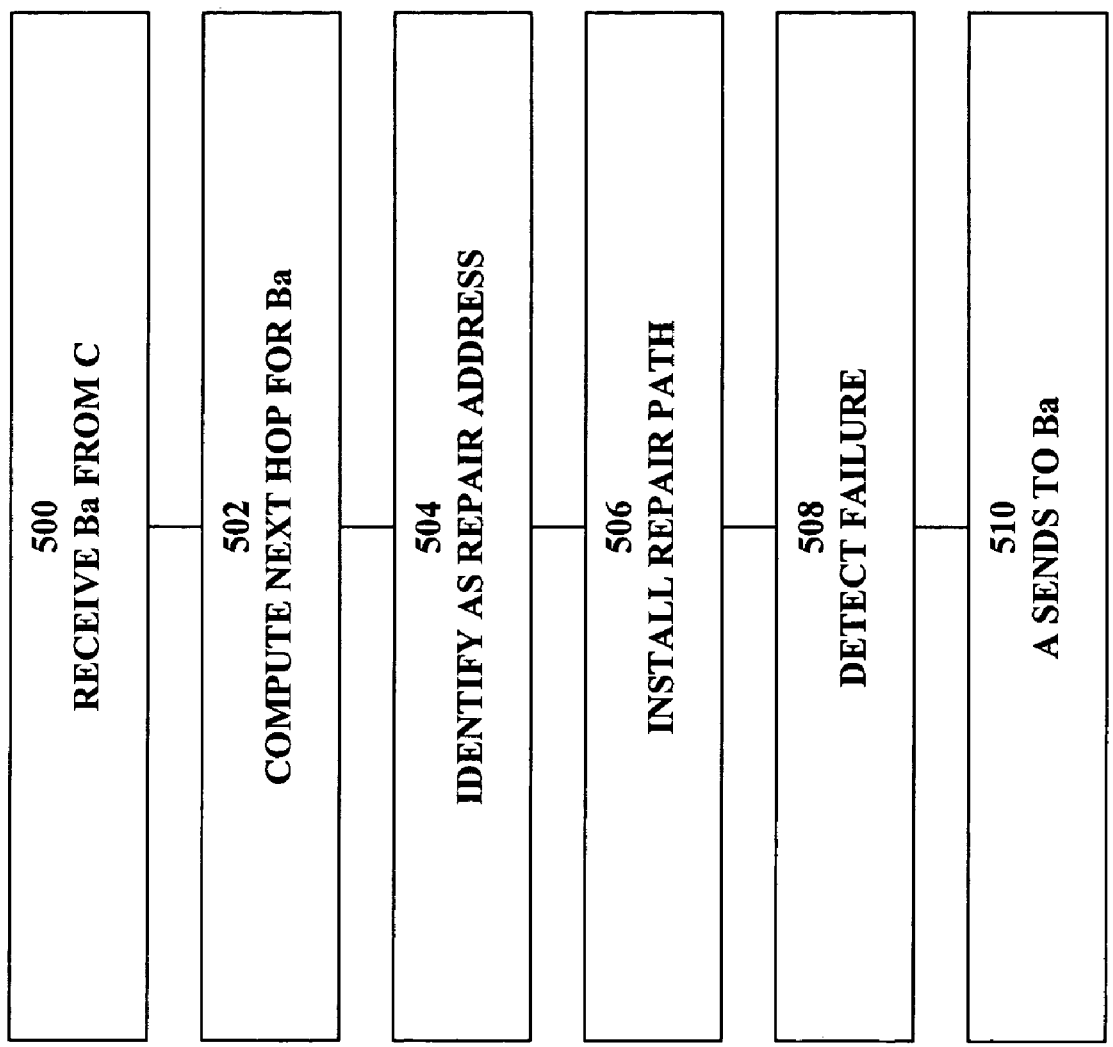
FIG. 5 illustrates in more detail steps performed at a repair instigating node during failure repair.

FIG. 5 is a flow diagram illustrating steps taken at node A as repair instigating node. At step 500 node A receives repair address Ba from node D, having been propagated via nodes C and E, where node B only forwarded Ba to node C. At step 502 node A computes its nexthop for Ba. At step 504 node A identifies Ba as a repair address in the event of failure of link 110. As discussed above this may be following a point to point connection verification protocol exchange with node B, or upon receipt of Ba as another address class in the routing protocol. Alternatively node A may have the address statically configured as a repair address. At step 506 node A installs the repair path in its FIB. Then, at step 508, upon detection of the failure of the link 110 which can be by any appropriate mechanism for example Bidirectional Forwarding Detection (BFD) as will be well known to the skilled person without requiring further explanation here, then at step 510 node A tunnels subsequent packets that it otherwise would have forwarded via node B, to repair address Ba and nexthop node D, defining a repair path notvia the failed component.

It will be appreciated with regard to FIG. 5 that if the manner of treatment of the propagatable repair address by the failure component is different then appropriate steps are taken. For example if node B forwards Ba in another address class then node A will suppress further propagation of the address. If node A receives the address with cost infinity then the routing protocol will automatically discount the address.

Figure 6:
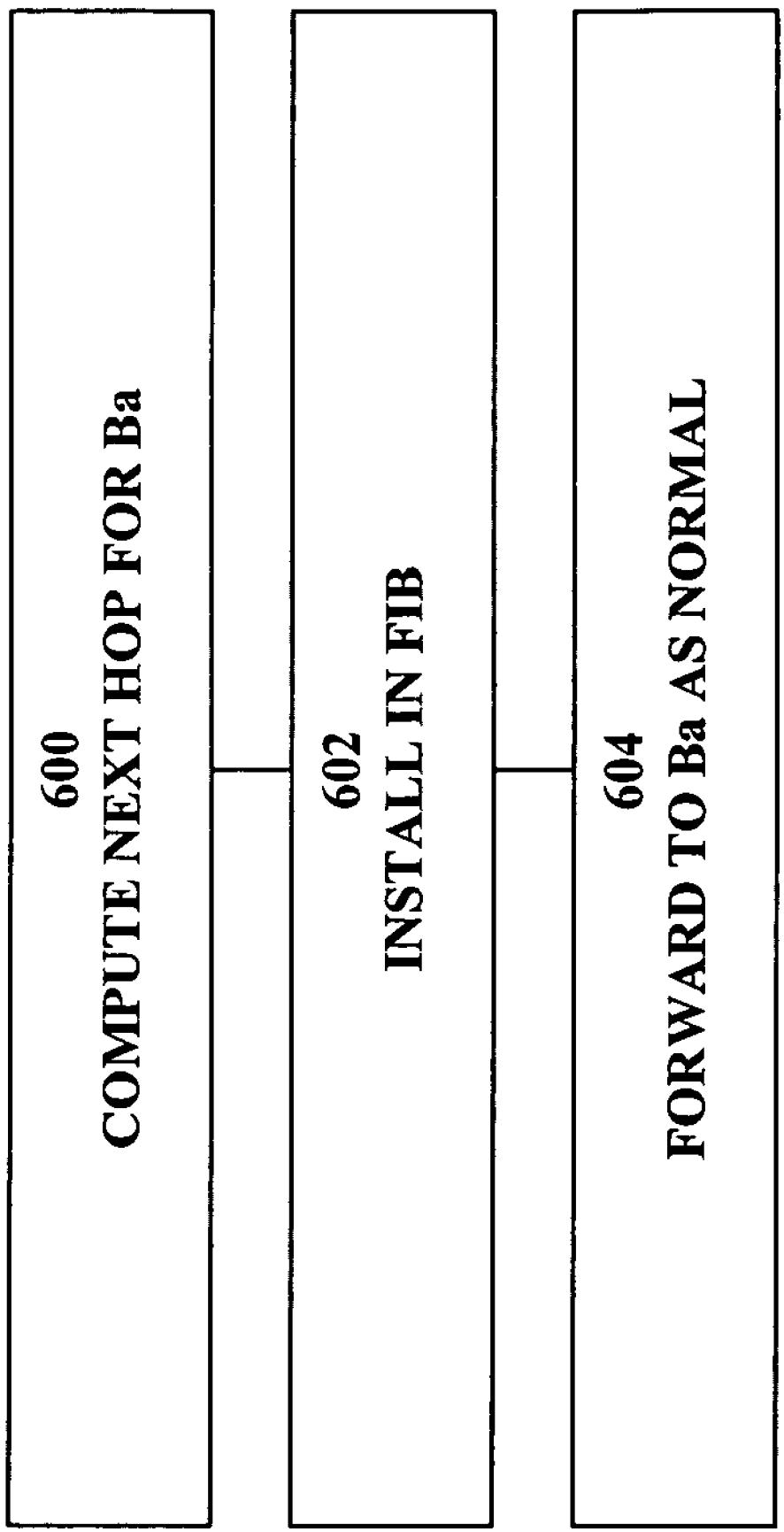
FIG. 6 illustrates in more detail the steps performed at a repair path node during failure repair.

FIG. 6 is a flow diagram, illustrating the steps performed at a repair path node that is for example node C which is in the repair path from node A to node B upon failure of link 110. At step 600 node C computes its nexthop (node B) for Ba as a normal address and using the standard RIP mechanism. At step 602 node C installs the forwarding information into FIB and at step 604, upon receipt of a packet with destination Ba, node C forwards the packet using normal forwarding to its computed nexthop.

It will be noted that the distance vector protocol, for example RIP, can be applied for the notvia reachability but that normal forwarding next hop calculation can be performed using another protocol such as normal interior gateway protocol (IGP) approaches, for example, a link-state protocol. In that case, for example, RIP can be used only to pass notvia addresses identified as such at each node. As a result the notvia repair paths can be computed automatically according to the approaches described above using REP. Alternatively again, on receipt of a notvia address in normal IGP routing, each node can emulate RIP or any other appropriate distance vector protocol to derive the notvia address for example using the Bellman Ford algorithm as is well known to the skilled reader.

It will be seen, according to this approach, that the computation steps required in computing a notvia address according to link-state topology calculation can hence be avoided.

Figure 7:
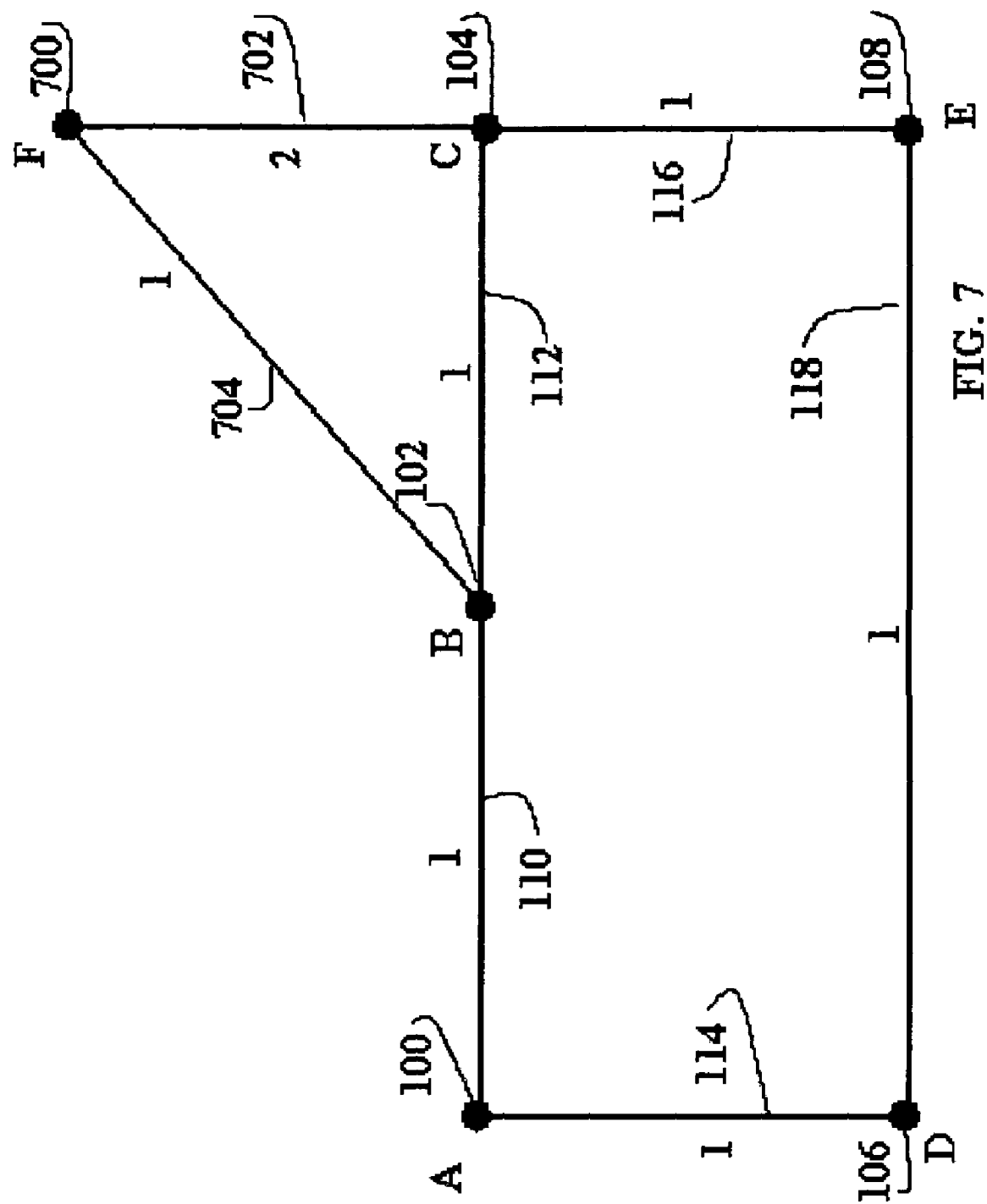
FIG. 7 is a representation of a network illustrating node failure.

Although the discussion above is directed to repairing link failures, for example failure of the link 110 between nodes A and B, it will further be seen that the approach can also be applied to node failure. This can be further understood with reference to FIG. 7 which is a network diagram of similar topology to that of FIG. 1 and hence carrying similar reference numerals except for the addition of a node F, reference numeral 700, which is joined to node C via link 702 and node B via link 704.

Figure 8:
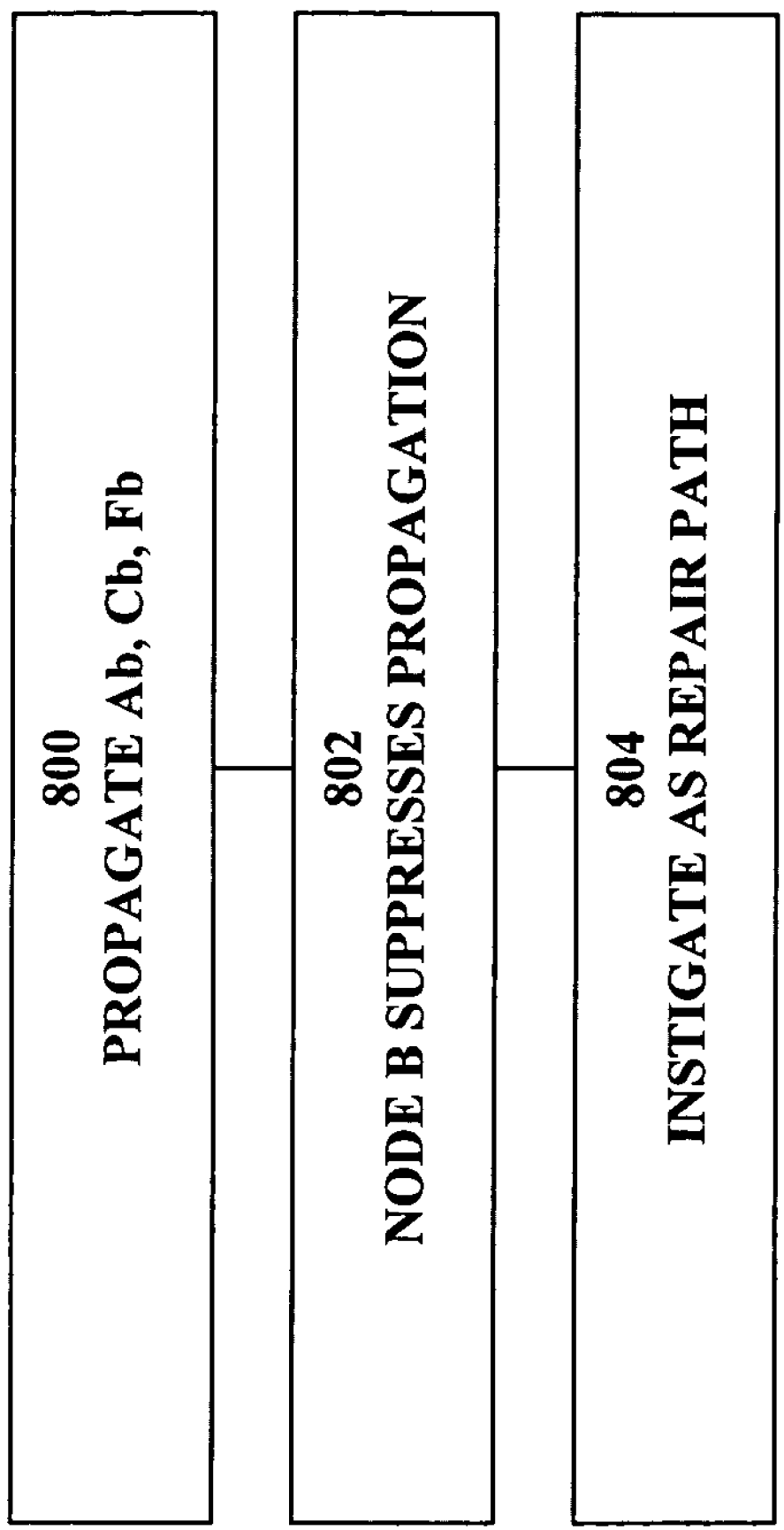
FIG. 8 is a flow diagram illustrating in more detail steps involved in node repair.

The steps taken in this case can be understood from FIG. 8 which is a flow diagram illustrating the steps taken by various participating nodes in installing node protection. At step 800 each of the neighbor nodes A, C, F to the failure component B advertises it is notvia address to each of their neighbors. For example node A advertises its notvia address Ab to nodes B and D, node C advertises its notvia address Cb to nodes B, E, and F and node F advertises its notvia address Fb to nodes B and C.

At step 802 node B, upon receiving each of the notvia addresses, and recognizing that they are notvia itself, suppresses propagation of those addresses or alternatively propagates them with cost infinity, the differential treatment hence ensuring that any path to the notvia address calculated using RIP will not pass via the failure component node B. Alternatively again it will be seen that each of nodes A, C and F can suppress propagation of the notvia addresses to node B but propagate to all other neighbors. In that case node B, if it receives a notvia address notvia itself indirectly can again suppress forwarding thereof recognizing it, for example, from the address class.

At step 804 each node computes its repair path to the notvia address using normal forwarding which, as the repair address has been treated as propagated differently via the failure component, ensures that normal RIP or distance vector computations will provide the correct repair path.

It will be noted that, once again, each of node B's neighbors A, C, F must recognize that the repair addresses will only be used in the event of failure detection at node B and which repair address should be used. For example if link 704 joining nodes F and B has cost 1 and link 702 joining nodes F and C has cost 2, then in normal forwarding node F would forward packets destined for node D via nodes B and A. Upon failure of node B, therefore, node F must tunnel to Ab, nexthop node C. This can be done in any appropriate manner as described above. The repair instigating node can identify which repair receiving node to tunnel repair packets to, (that is, which notvia address to use.) for example by identifying which destinations are served by which neighbor nodes to the failed node and using the corresponding repair address. This information can be derived, for example, from the routing information. For example where link state forwarding is also in operation then the topology information is available from the link state routing information allowing each node to identify its neighbors and neighbors for repair purposes. Alternatively the information can be statically configured. Alternatively, again it may be signaled for example in conjunction with the notvia address itself.

It will be appreciated that the approaches described herein can be used for any distance vector mechanism, not restricted to routing vector protocols such as RIP. For example the approach can be applied to path vector protocols where each node receives reachability metrics from neighbor nodes and in addition receives a route vector.

It will be noted that the path vector approach is particularly useful in the case of node protection as the path vector will include the next-nexthop information and hence the repair target (repair receiving node) derivable at a repair instigating node such that forwarding decisions upon node repair can be more simply implemented.

As a result of the approaches described above and in particular by suppressing or treating differently the sending of the notvia reachability information towards the component being protected, notvia repair paths correctly form in the network as a result of the intrinsic operation of distance or path vector protocols.

It will be noted that the burden of computing notvia address can be reduced by using loop free alternates (LFA), that is, next loop providing a path to destinations from which the packet will not loop back, as will be known to the skilled reader. When LFA's are available, therefore, upon detection of a failure, a repairing node will forward to a node providing an LFA to the packet destination. In addition the repairing node can signal to the failure node if no notvia address is required such that it need not be advertised.

The approach can be implemented in any appropriate network or environment using any appropriate distance or path vector protocol in which neighbors exchange reachability metrics. The manner in which the method described herein is implemented may be using software, firmware, hardware or any combination thereof and with any appropriate code changes as will be apparent to the skilled reader without the need for detailed description herein. For example any appropriate mechanism can be implemented, suppressing propagation of the notvia address via the failed component, installing notvia addresses as repair addresses at the repair instigating node and so forth.

4.0 Implementation Mechanisms—Hardware Overview

Figure 9:
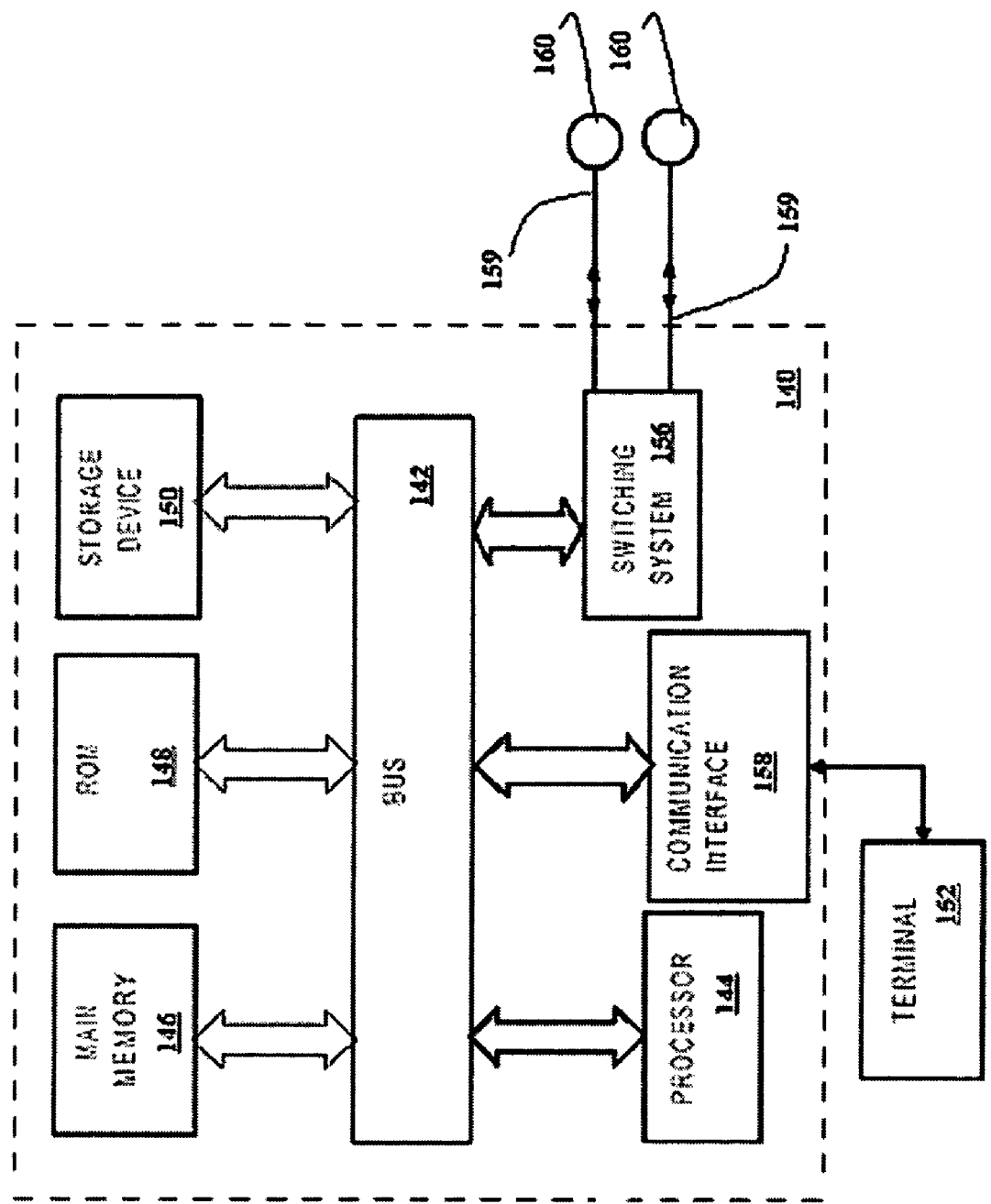
FIG. 9 is a block diagram that illustrates a computer system upon which a method for forwarding data in a data communications network may be implemented.

FIG. 9 is a block diagram that illustrates a computer system 40 upon which the method may be implemented. The method is implemented using one or more computer programs running on a network element such as a router device. Thus, in this embodiment, the computer system 140 is a router.

The computer system 140 implements as a router acting as a repair instigating, repair receiving or repair path node the above described method of forwarding data. Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a router acting as a participating node, repairing node or notifying node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Furthermore, although repair paths are pre-computed in the discussion above, alternatively they can be computed "on-the-fly".

What is claimed is:

1. An apparatus for forwarding data in a data communications network, having as components nodes and links therebetween, the apparatus comprising:
   one or more processors; and
   a machine-readable storage medium storing one or more sequences of instructions, which when executed by the one or more processors, cause the one or more processors to perform:
      while a failure component is still operational:
         obtaining a reachability metric between a neighbor node and one or more other nodes in the data communications network;
         creating a repair path between an instigating repair node and a receiving repair node around the failure component therebetween and a propagatable repair address for the receiving repair node is reachable by a repair path notvia the failure component;
         treating propagatability of the repair address differently via the failure component than via other components;
      wherein the repair path notvia the failure component is pre-computed while the failure component is still operational and does not include the failure component;
      wherein the propagatable repair address is propagated while the failure component is still operational; and
      wherein the propagatable repair address is propagated via the repair path notvia the failure component.

2. An apparatus as claimed in claim 1 wherein the receiving repair node is arranged to treat propagatability of the repair address differently by only propagating the repair address via components other than the failure component.

3. An apparatus as claimed in claim 1 wherein the receiving repair node is arranged to treat propagatability of the repair address differently by propagating the repair address via the failure component with a differentiating characteristic.

4. An apparatus as claimed in claim 1 wherein the receiving repair node is arranged to treat propagatability of the repair address differently by propagating the repair address via the failure component with a differentiating characteristic, wherein the differentiating characteristic comprises a cost characteristic or an address class.

5. An apparatus as claimed in claim 1 the receiving repair node is arranged to treat propagatability of the repair address differently by only propagating the repair address via components other than the failure component, wherein the receiving repair node is arranged to signal to the instigating repair node to identify the repair address as an address for repair of failure of the failure component.

6. An apparatus as claimed in claim 1 wherein the instigating repair node is arranged to treat propagatability of the repair address differently by suppressing propagation of the repair address or propagating the repair address with a differentiating characteristic.

7. An apparatus as claimed in claim 1 wherein the instigating repair node is arranged to treat propagatability of the repair address differently by suppressing propagation of the repair address or propagating the repair address with a differentiating characteristic, wherein the instigating repair node is arranged to identify the repair address as a repair address for a repair path around a failure component.

8. An apparatus as claimed in claim 1 wherein the repair path node is arranged to update forwarding information for the repair address computed according to a distance vector protocol.

9. An apparatus as claimed in claim 1 wherein the repair path node is arranged to update forwarding information for the repair address computed according to a distance vector protocol, wherein the repair path node is arranged to forward non-repair address traffic via a route computed by a distance vector protocol.

10. An apparatus as claimed in claim 1 in which the receiving repair node is arranged to propagate the repair address to each neighbor excluding a failure component node.

11. An apparatus as claimed in claim 1 in which the reachability metric comprises a distance vector metric.

12. An apparatus as claimed in claim 1 wherein execution of the one or more sequences of instructions by one or more processors causes the one or more processors to further perform:
   determining if a loop free alternate (LFA) is available, and in response thereto, forwarding via the LFA rather than the notvia address.

13. A method of forwarding data in a data communications network having as components nodes and links therebetween, comprising:
   while a failure component is still operational:
      receiving a reachability metric between a neighbor node and one or more other nodes in the data communications network;
      creating a repair path notvia the failure component, the repair path being between an instigating repair node and a receiving repair node around the failure component therebetween;
      receiving a propagatable repair address for the receiving repair node reachable by the repair path notvia the failure component; and
      propagating the repair address notvia the failure component.

14. A method as claimed in claim 13 further comprising a repair node treating propagatability of the repair address differently by only propagating the repair address via components other than the failure component.

15. A method as claimed in claim 13 wherein the receiving repair node treats propagatability of the repair address differently by propagating the repair address via the failure component with a differentiating characteristic.

16. A method as claimed in claim 13 wherein the receiving repair node treats propagatability of the repair address differently by propagating the repair address via the failure component with a differentiating characteristic, wherein the differentiating characteristic comprises a cost characteristic or an address class.

17. A method as claimed in claim 13 wherein the receiving repair node treats propagatability of a repair address differently by only propagating the repair address via components other than the failure component, wherein the receiving repair node is arranged to signal to the repair instigating node to identify the repair address as an address for repair of failure of the failure component.

18. An apparatus comprising:
   one or more processors; and
   a network interface communicatively coupled to the one or more processors and configured to communicate one or more packet flows among the one or more processors in a network;
   while a failure component is still operational:
      means for receiving a reachability metric between a neighbor node and one or more other nodes in the network;
      means for creating a repair path not via the failure component, the repair path being between an instigating repair node and a receiving repair node around the failure component therebetween;
      means for receiving a propagatable repair address for the receiving repair node is reachable by the repair path notvia the failure component; and
      means for propagating the repair address notvia the failure component.

19. An apparatus as claimed in claim 18 wherein the receiving repair node comprises means to treat propagatability of the repair address differently by only propagating the repair address via components other than the failure component.

20. An apparatus as claimed in claim 18 wherein the receiving repair node comprises means to treat propagatability of the repair address differently by propagating the repair address via the failure component with a differentiating characteristic.

21. An apparatus as claimed in claim 18 wherein the receiving repair node comprises means to treat propagatability of the repair address differently by propagating the repair address via the failure component with a differentiating characteristic, wherein the differentiating characteristic comprises a cost characteristic or an address class.

22. An apparatus as claimed in claim 18 wherein the receiving repair node comprises means to treat propagatability of the repair address differently by only propagating the repair address via components other than the failure component, wherein the receiving repair node is arranged to signal to the repair instigating node to identify the repair address as an address for repair of failure of the failure component.

* * * * *